Oct. 15, 1940.     J. H. RHODES     2,218,008
PNEUMATIC TIRE VALVE
Filed Nov. 10, 1938
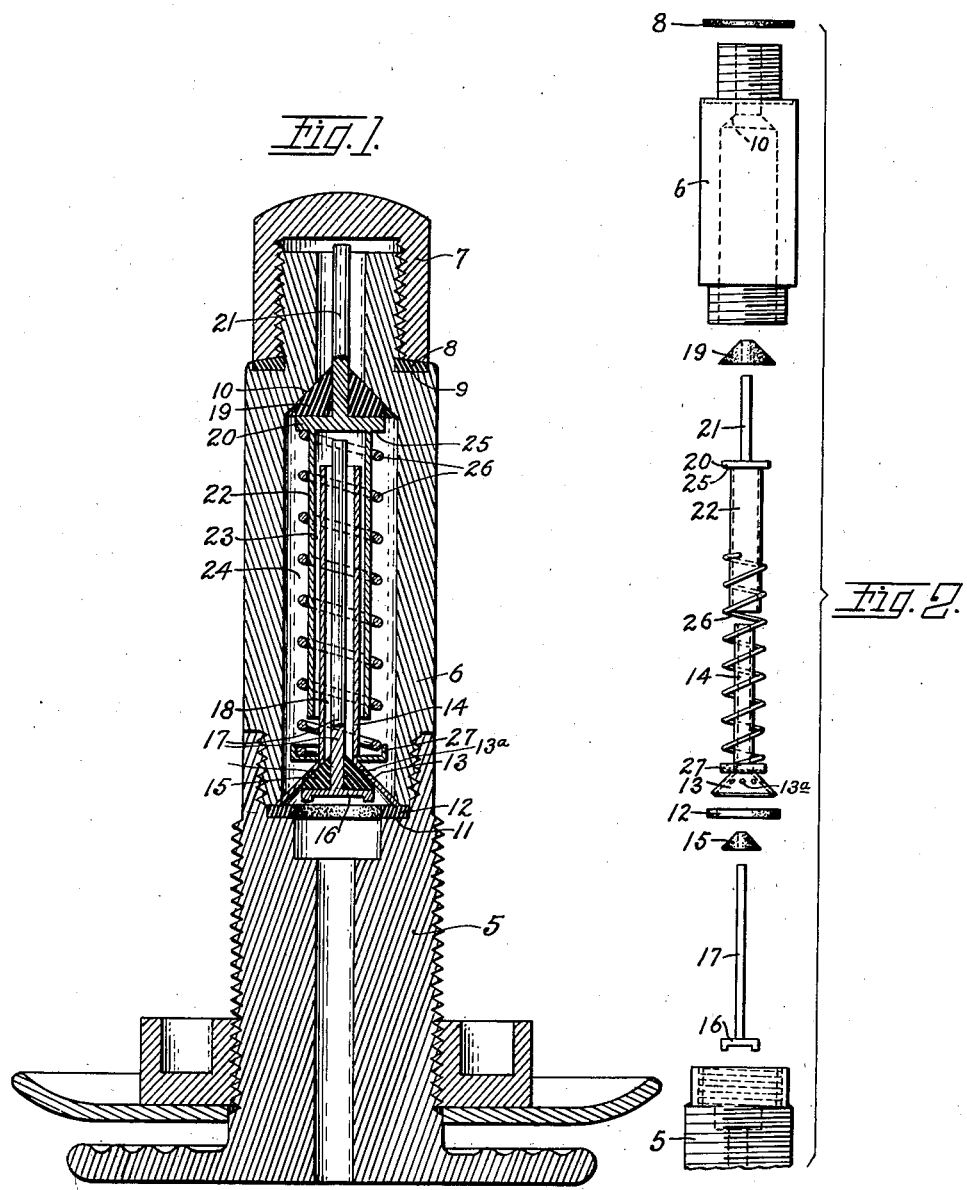
Inventor,
J. H. RHODES.
Attorney.

Patented Oct. 15, 1940

2,218,008

UNITED STATES PATENT OFFICE 2,218,008

PNEUMATIC TIRE VALVE

John H. Rhodes, Legrand, Iowa

Application November 10, 1938, Serial No. 239,761

3 Claims. (Cl. 152—429)

This invention relates to an improved form of pneumatic tire valve.

One object of the invention is to provide a very practical form of tire-valve with multiple air-sealing closures so as to provide maximum security against leakage of the air through the valve.

Another object is to provide an improved jointed or two-piece valve-stem that is normally air-sealed at its joint and which can quickly be disjointed and then quickly repaired or re-fitted with any of its internal elements that may have deteriorated or become defective, all without disturbing the union of the basal part thereof with the tire.

Other objects and important features are pointed out or implied in the following details of construction in connection with the accompanying drawing in which:

Fig. 1 is a central or axial sectional view showing one of the counterpart halves of the valve that constitutes my invention.

Fig. 2 is an "exploded" view showing all, except the cap and the tire-clamping end-portion, these parts being of reduced proportions with respect to the proportions of Fig. 1.

Referring to this drawing in detail, in which, similar reference numerals refer to similar parts in both views, the invention is described in detail as follows:

The valve-stem comprises a tubular tire-attaching unit 5 and a tubular cover-attaching unit 6, the upper or outer end of the latter being externally screw-threaded to engage with an internal screw-thread of a cap, cover or closure 7, the latter being normally screwed tight against a rubber-like sealing ring or gasket 8 on a shoulder 9 of the unit 6. The upper or outer end of this unit 6 is also provided with a preferably conical valve-seat 10, while its lower or inner end is externally screw-threaded and interengaged with the internally screw-threaded end of the base or tire-attaching unit 5 which latter is provided with a shelf or shoulder 11 having a sealing ring or gasket 12 thereon, fitted tightly between this shoulder and the contiguous inner end of the unit 6, and as this ring 12 is of rubber-like material, it effectually prevents leakage at the joint between the units 5 and 6.

An inner valve-seat 13 has its periphery clamped between the shoulder 11 and the inner end of the unit 6, the peripheral edge of the valve-seat 13 being pressed into the sealing ring so the latter performs the second function of closing and air-sealing the joint around the valve-seat 13. This valve-seat is preferably funnel-shaped and has, in addition to its central opening, any desired number of peripheral openings 13a to provide ample space for air to be pumped through, but being normally closed to prevent exit or escape of air; and this valve-seat has a tubular outward extension 14 that terminates a distance from the valve-seat 10. An inner valve-closing unit is formed of a rubber-like valve-closure 15 seated on a disc or base-seat 16 that is united with an actuating and guiding rod 17 which extends entirely through and outwardly beyond the tubular element 14, being spaced from the latter to provide an internal air passage 18.

An outer valve-closing unit is formed of a rubber-like valve-closure 19 on a disc or base-seat 20 that has united therewith an actuating rod 21 extending to the outer end of the unit 6; and the inner side of the base-seat 20 has a tubular inward extension 22 around and spaced from the tube 14 so an intermediate air-passage 23 surrounds the latter and is in open communication with the internal air-passage 18 and with an external air-passage 24 around the tube 22; so these air-passages 18, 23, and 24 are in fact a circuitous air-passage that is normally closed at both ends by the closures 15 and 19. The inner side of the valve-base-seat 20 projects laterally beyond the adjoining end of the tube 22 so as to provide a spring-seat 25, and a helical compression spring 26 is compressed between this seat 25 and a spring-seat 27 on the valve-seat element 13 so as to yieldingly press the valve-closure 19 against the seat 10 and thus prevent escape of air past the outer valve in the event of any leak occurring at the inner valve.

In using the words "inner" and "outer," the latter refers to parts remote from the tire-attaching end, while "inner" refers to parts nearer the tire-attaching end.

Preparatory to pumping up a tire equipped with this valve, the cap or closure 7 is first removed, and the rod 21 is pushed inward so as to unseat the valve-closures 19 and 15, one at a time, the closure 19 being unseated first, and as its base presses against the outer end of the rod 14, the consequent movement of the latter unseats the closure 15; and now that these closures are unstuck, the pump can be applied and operated in the usual way. When pumping is completed, the valve-closure 15 is immediately seated by air pressure alone, while the valve closure 19 is immediately seated by pressure of the spring 26.

In the foregoing, I have referred to the closures 15 and 19 and to the sealing rings 8 and 12 as being "rubber-like," this expression being intended to apply to rubber or to any material having qualities of flexibility or compressibility, elasticity and relative air-excluding capability.

I have no intention of limiting my patent protection to the precise details of description in the foregoing, for this invention is susceptible of numerous changes within the scope of the inventive ideas as implied, and as claimed hereinafter.

What I claim as my invention is:

1. In a pneumatic tire-valve, the combination of a tubular tire-attaching unit and a tubular closure-attaching unit normally joined together to form a valve-stem and provided with air-sealing means in the joint therebetween, an inner valve-seat having its periphery clamped in the joint between the tire-attaching unit and the closure-attaching unit and having a tubular element extending outward towards the closure-attaching end of the valve-stem, an inner valve-closing unit that includes a rubber-like valve-closure and a base-seat therefor and a rod united with said base-seat and extending outward through said tubular element to a point beyond the outer end of the latter while the rubber-like valve-closure is fitted against said inner valve-seat, said closure-attaching unit having an outer-end valve-seat therein, an outer valve-closing unit that is disjoined from the inner valve-closing unit and includese a rubber-like outer valve-closure and a base-seat therefor and an outer tubular element that extends towards said tire-attaching unit and encloses the main part of the first-said tubular element, the last said base-seat having its margin extended laterally beyond the periphery of said outer tubular element so as to provide a spring-seat, and a helical spring around said tubular elements and compressed between said inner valve-seat and said spring-seat so as to press the outer valve-closure yieldingly against said outer-end valve-seat.

2. The combination defined by claim 1, said inner valve-seat being free to be moved by air-pressure against said inner valve-seat and to be unseated by inward movement of said outer valve-closing unit thereagainst, said outer valve-closing unit being operable for movement against said rod and thereby effective for unseating said inner valve-seat, substantially as specified.

3. The combination defined by claim 1, said inner valve-seat having a central opening in open communication with said tubular element and having eccentric openings out of communication with said tubular element, said eccentric openings being in positions to be closed by said inner-valve-closing unit.

JOHN H. RHODES.